(No Model.)
J. J. RICKETTS.
COUPLING FOR WATER CLOSETS.
No. 492,946. Patented Mar. 7, 1893.
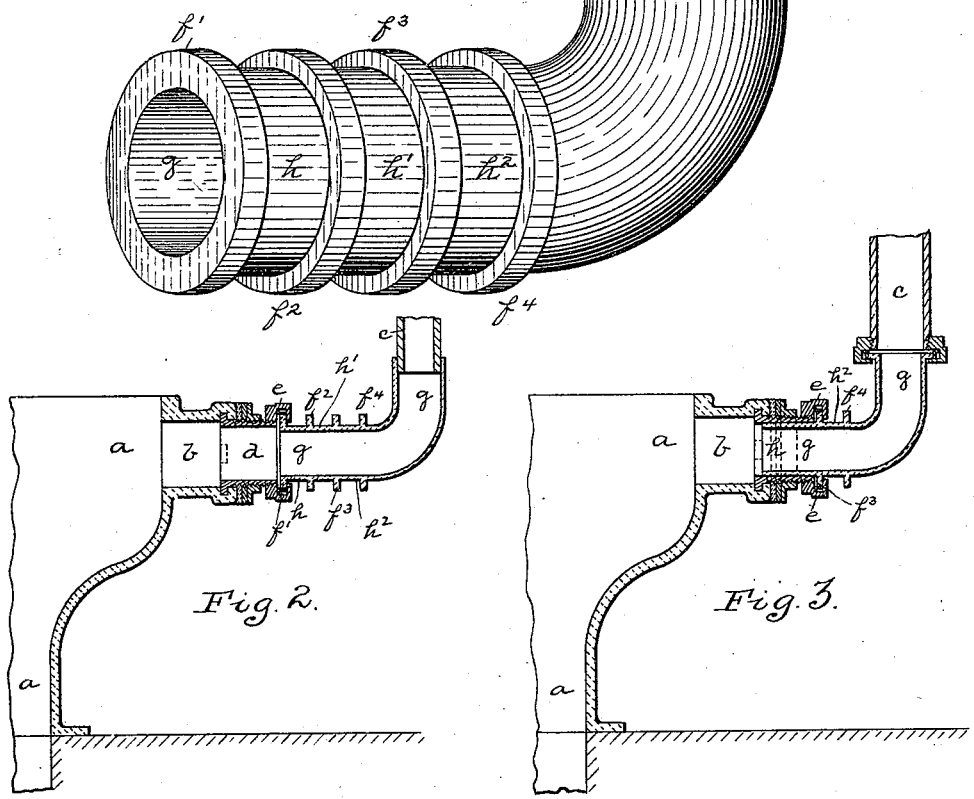

UNITED STATES PATENT OFFICE.

JAMES J. RICKETTS, OF PITTSBURG, PENNSYLVANIA.

COUPLING FOR WATER-CLOSETS.

SPECIFICATION forming part of Letters Patent No. 492,946, dated March 7, 1893.

Application filed March 26, 1892. Serial No. 426,555. (No model.)

*To all whom it may concern:*

Be it known that I, JAMES J. RICKETTS, a resident of Pittsburg, in the county of Allegheny and State of Pennsylvania, have invented a new and useful Improvement in Couplings for Water-Closets; and I do hereby declare the following to be a full, clear, and exact description thereof.

My invention relates to couplings for water closets and like pipes, its object being to provide a flexible elbow or pipe connection between the pipe and bowl which is adjustable according to the distance between the pipe and the bowl, or other such parts, and which overcomes the necessity of such careful placing of the pipes and bowl with relation to each other as heretofore required; my invention relating to that class of couplings set forth in Letters Patent Nos. 434,116 and 434,117, granted to me August 12, 1890. As the water closet bowl is necessarily arranged exactly over the soil pipe and the walls of the rooms or partition to which the flushing pipe is secured may not be in exactly the proper position for connection with the bowl, it is evident that some means of making a quick connection and easily arranging the parts according to the relative position of the pipe and bowl is desirable, and this is filled by the present invention.

To these ends my invention consists, generally stated, in combining with the water closet or like bowl, and the pipe leading thereto, a rubber elbow or like pipe having the part thereof extending out to the horn of the bowl adjustable according to the distance between the feed pipe and horn, and a collar or like means for securing the elbow to the horn.

It also consists in certain other improvements in the flexible elbow or pipe hereinafter referred to.

To enable others skilled in the art to make and use my invention, I will describe the same more fully, referring to the accompanying drawings in which Figure 1 is a perspective view of the rubber elbow embodying my invention, and Figs. 2, 3 and 4 show connection of the same with the horn of the water closet bowl, illustrating the use of the same.

Like letters of reference indicate like parts in each.

My invention is generally embodied in an elbow such as shown in Fig. 1, though in some positions of the pipe and bowl a straight flexible connection, such as shown in Fig. 4, may be employed. The water closet bowl is shown at $a$ and its horn at $b$, while the pipe leading from the tank is shown at $c$. It will, of course, be understood that it often occurs that the pipe $c$ is not exactly in the position desired for connection to the horn, while it is not desirable that either the pipe or closet shall be moved, and consequently a flexible connection between the two which can be made or adjusted to fit is very desirable under such circumstances. In the construction shown the spud $d$ is secured in the horn of the bowl in the ordinary way and extends out therefrom so as to receive the collar or clamp $e$ by which the flexible elbow is connected to the bowl. The elbow or like flexible connection is formed of rubber and it is connected to the spud by means of the annular flanges thereon which are pressed by the threaded collar $e$ against the spud to form a water tight joint. It will be seen that the elbow has a number of these annular flanges thereon, for example, the flanges $f'$, $f^2$, $f^3$, $f^4$, the flange $f'$ being formed at the end of the elbow, while the flange $f^2$ is formed some little distance back from the same, and the flanges $f^3$, $f^4$ are formed back of the flange $f^2$, sufficient space being left between the flanges to permit of the collar or nut being passed back of the flange so as to press the same against the spud. As the elbow is flexible, it can be drawn back and forth a sufficient distance to bring it into proper relative position with the spud for the space between such flanges, so permitting of the flexion for that distance, but in case of the distance being greater than can be accomplished by such flexion of the elbow or flexible tube, either one of the several flanges on the elbow may be employed to make the connection with the spud according to the space between the pipe and the bowl.

In Fig. 2 I have shown the elbow $g$ with its flanges $f'$, $f^2$, $f^3$, $f^4$, and the elbow connected to the spud by its flange $f'$. In Fig.

3 I have shown it connected to the spud by the flange $f^3$, while in Fig. 4 I have shown it connected by the flange $f^2$, the flexible tube thus providing for the adjustment of the same to the bowl according to the distance between the pipe and bowl. In making such connection, I remove from the pipe the flange which would project beyond the distance necessary for making the connection. This I may accomplish either by cutting off the body of the flexible tube, such as the portion $h$ when connecting with the flange $f^2$, the portion $h'$ in connecting with the flange $f^3$, or the portion $h^2$ in connecting with the flange $f^4$, this being a very simple method of making connection, and by removing such part or parts making the remaining flange the flat faced washer at the end of the elbow. Instead of this, however, the flanges may themselves be cut from the body of the elbow, in which case the portion extending beyond the flange used to make the joint, such as the portion $h$ in Fig. 4, extends within the spud telescoping therewith, and when water is passing through the same such tongue is expanded against the interior surface of the spud, and so assists in preventing leakage in the manner described in my said patent No. 434,117. Such tongue is not necessary, however, where the collar or nut is employed to force the flanges against the spud, as a perfectly tight joint may be obtained through the compression of the washer formed by the flange against the spud. The flange on the flexible elbow is inserted in the collar by compressing it, and when inserted it will expand so that the particular flange employed will enter the seat in the collar. The vertical or other feed pipe $c$ may be connected to the flexible elbow or like connection in any suitable way, it being shown as contracted and fitting within the same in Fig. 2 and as connected thereto by the collar in Fig. 3.

Through my invention I am thus enabled to obtain an adjustable flexible connection between the feed pipe and the horn of the bowl in which the parts may be quickly connected, even though the space between them varies in individual cases, and only one class of elbow or flexible connection is required for any joint, the necessity of providing different lengths of flexible connections according to the space between the pipe and bowl which has always occurred in rigid connections, and in flexible connections heretofore made, being overcome.

What I claim as my invention, and desire to secure by Letters Patent, is—

In combination with the horn of a water closet or like bowl, a rubber or like flexible connection having the part thereof extending out to the horn provided with a series of flanges extending around the same, and a collar or nut adapted to engage with said flanges according to the adjustment of the connection, substantially as and for the purposes set forth.

In testimony whereof I, the said JAMES J. RICKETTS, have hereunto set my hand.

JAMES J. RICKETTS.

Witnesses:
J. N. COOKE,
ROBT. D. TOTTEN.